United States Patent [19]

Ebner et al.

[11] Patent Number: 5,048,458
[45] Date of Patent: Sep. 17, 1991

[54] METHOD OF BREEDING FISH

[75] Inventors: Guido Ebner, Eiken; Heinz Schürch, Riehen, both of Switzerland

[73] Assignee: Ciba-Geigy Corporation, Ardsley, N.Y.

[21] Appl. No.: 369,483

[22] Filed: Jun. 19, 1989

[51] Int. Cl.$^5$ ............................................. A01K 63/00
[52] U.S. Cl. ...................................................... 119/3
[58] Field of Search ............................................ 119/3

[56] References Cited

U.S. PATENT DOCUMENTS

| 4,297,352 | 3/1981 | Habegger | 119/5 |
| 4,594,965 | 6/1986 | Asher et al. | 119/3 |

FOREIGN PATENT DOCUMENTS

| 1029938 | 7/1983 | U.S.S.R. | 119/3 |
| 1178372 | 9/1985 | U.S.S.R. | 119/3 |
| 2100112 | 12/1982 | United Kingdom . | |

OTHER PUBLICATIONS

Chem. Abstract, 95: 165987(1981).
Goodman et al., Bioelectromagnetics, 7, 23–29 (1986).

*Primary Examiner*—Robert P. Swiatek
*Attorney, Agent, or Firm*—George R. Dohmann; Edward McC. Roberts

[57] ABSTRACT

There is disclosd a novel method which, based on the brief application of electrostatic fields, induces to lasting useful and desirable properties in fish, which properties cannot otherwise be induced at all or can only be induced by dint of substantial additional investment in time and material resources. The simplicity of the measures proposed in this invention and the significant results obtained will revolutionize the breeding of fish, especially edible fish, but also ornamental fish.

17 Claims, 1 Drawing Sheet

METHOD OF BREEDING FISH

The present invention relates to a novel method which, based on the brief application of electrostatic fields, induces lasting useful and desirable properties in fish, which properties cannot otherwise be induced at all or can only be induced by dint of substantial additional investment in time and material resources. The simplicity of the method of this invention and the significant results obtained make it possible to improve very substantially the breeding of freshwater and saltwater fish, especially of edible fish and also of ornamental fish.

The method of the present invention essentially comprises exposing early development stages of fish, such as juvenile fish or preferably eggs, before, during or after fertilisation, especially eggs in early phases of cell division, for a short time to electrostatic fields, without the flow of electric currents. It is particularly preferred to use eggs during or immediately after fertilisation.

Specifically, in the practice of this invention, tanks (aquaria) filled with freshwater or saltwater and containing the fish or eggs, and consisting preferably of electrically non-conductive material (insulator), are placed between the electrodes of a capacitor. A direct-current voltage of one to tens of thousands of volts is then applied to said electrodes. Instead of using the non-conductive aquarium material, it is of course also possible to use electrodes which are provided with an insulating layer and to immerse these electrically insulated capacitor plates direct in the tanks. Of sole importance is that the electrodes of the capacitor are insulated against the freshwater or saltwater acting as dielectric medium. As no currents flow in this apparatus, no perceptible loss of energy is observed. Hence energy is not a cost factor in this invention.

A further essential feature of this invention is that, because no electric current flows, the chemical identity of the system "fish" does not undergo change.

Interest in the investigation of parameters which exert a direct or indirect activity on physico-chemical interactions in living organisms has so far centered almost exclusively on the influence of temperature, pressure, electromagnetic radiation and electrodynamic fields (alternating fields). In contrast, far less attention has been paid, for example, to the investigation into possible interactions of electrostatic fields on the development of higher organisms, especially fish.

Only recently have reports become more frequent on the possible effects of gravitation and magnetic fields on biological systems. Thus, for example, Goodman and Henderson [Bioelectromagnetics, 7: 23–29, 1986] have found indications that a correlation exists between electromagnetic fields and the rate of transcription in biological material, the rate being influenced favourably by the applied electromagnetic field so that enhanced transcription results.

In contrast, it would appear that the possibility that electrostatic fields might also have an influence on the course of physico-chemical interactions in organisms, especially also in early development phases, has so far been ruled out from the start. Hence there have to date been no reports on the possible effect of electrostatic fields on the development of fish.

Experiments have, however, been described (C.A. 95: 165 987b; Vosyliene et al.), in which trout (*Salmo iridens*) and carp (*Cyprinus carpio*) were exposed over long periods to field strengths of 0.03–0.08 V/cm and 0.06–0.10 V/cm. These experiments dealt principally with the influence of the voltage applied on brain development and the excretion of noradrenalin, depending additionally on the season.

The reason why there has been so little investigation into the effects of electrostatic fields may primarily be that, in the light of conventional teaching, it has been assumed that an electrostatic field in a medium filled with charge carriers is shielded by the spontaneous formation of an electric double layer and consequently remains inert in its effect.

This teaching is based essentially on the equation formulated by C. Gouy and D. L. Chapman, according to which the actual thickness of a diffuse double layer for an electrolyte is $$d = \frac{1}{F} \cdot \sqrt{\frac{1000 \, \epsilon \, RT}{4 \, \pi \, \Sigma \, c_i z_i^2}}$$

wherein
 d = the thickness of the double layer
 F = the Faraday constant
 $\epsilon$ = the dielectric constant
 R = the universal gas constant
 T = the absolute temperature, and
 i = the nature of the ions of concentrations $c_i$ and valences $z_i$.

Surprisingly, this prejudice has now been overcome with respect to fish in the practice of this invention by the application of simple measures.

In contradistinction to the conventional teaching elaborated above, the aim has now for the first time been successfully achieved, within the scope of this invention, of providing a method by which it is possible to induce in fish lasting desirable and useful changes, which method is based on a modification of physico-chemical interactions induced by the effect of an electrostatic field.

As previously stated, this aim can be achieved most simply by exposing juvenile fish or fertilised fish eggs to an electrostatic field, such that the physico-chemical interactions which take place during cell division and differentiation, and which it is desired to modify with the aid of the method of this invention, take place under the influence of a defined electrostatic field under controlled conditions.

Accordingly, the present invention relates to a method of inducing desirable and useful properties in fish, which comprises a) exposing early development stages of fish to an electrostatic field, such that the physico-chemical reactions which it is desired to modify take place under the influence of a defined electrostatic field under controlled conditions, but without thereby changing the chemical identity of the system itself, and b) keeping said early development stages of fish in said electrostatic field for a period of time necessary for a stable development of the desired modification.

Throughout this specification, the expression "early development stages of fish" shall be understood as meaning all stages starting from the egg (egg cell), preferably the fertilised egg, through the different embryonic stages right up to the hatchable or hatched juvenile fish. These are the stages of frequent cell division and differentiation in which the electrostatic fields produce favourable and lasting results.

Especially preferred in this connection are fish eggs which are actually fertilised in the static field or which are exposed to the influence of an electrostatic field only after fertilisation—most preferably directly after.

A favourable, and therefore within the scope of this invention preferred, period of time during which these early development stages remain in the electrostatic field, is the time until the eggs ripen, especially until they hatch. This period of time will normally depend on external conditions, for example water temperature, the oxygen concentration and the like, but most especially on the species of fish.

Afterwards, the juvenile fish are transferred to larger tanks, as is usual in fish breeding, where they mature to a desired growth stage.

The really surprising feature is that these juvenile fish which have been pretreated in the described manner and transferred to normal breeding tanks differ significantly from untreated control groups.

Firstly, a substantially higher hatching rate of the treated fish egges is observed, with frequently an increase of 100 to 300% and even higher values being achieved. Secondly, these juvenile fish make a far more agile and more vital impression than the untreated comparison fish. Very significant is their markedly higher survival rate which extends not only to their first few days, but virtually to their entire life cycle. This feature becomes all the more marked if all medication is dispensed with. For it is then observed that, in the first few days and weeks, the untreated control group (not exposed to an electrostatic field) is at least twice as heavily reduced by the non-artificially inhibited and naturally occurring population of pathogens as the fish that have been exposed to treatment with an electric field. In addition, the treated fish, while receiving identical feeding, grow in weight and size far faster and reach adulthood significantly earlier, and hence can be transferred to natural waters or are available for marketing as edible or ornamental fish. Further, no deleterious changes in the progeny of these treated fish are observed. On the contrary, a certain element of the vitality seems to be transferable to the progeny.

All in all, the fish treated by the method of this invention are substantially more vital than the untreated comparison fish and reach adulthood earlier. For the fish breeder this means a reduction in the consumption of medicaments and antibacterial agents, even to the extent of dispensing with such substances completely, a perceptibly more efficient utilisation of the fish feed employed, and a shortened rearing phase. These are advantages which no other expedient at present known is able to afford.

The mechanism on which the method of this invention is based is at present not known and will require elucidation in the future.

On the whole, the application of the method of this invention results surprisingly, for example, in a favourable change in the development and growth efficiency, in the morphogenesis, possibly in the gene expression patterns, in proneness to stress, resistance to pathogens, and many other characteristics.

A primary object of this invention is accordingly the provision of a method of enhancing the efficiency of the development and breeding of freshwater and saltwater fish. Especially preferred is a method of enhancing the efficiency of the development and growth of edible fish.

Also falling within the scope of this invention are the fish themselves in which change has been induced by the application of the method of this invention, which fish have an enhanced development of growth efficiency, and the progeny thereof, provided these latter still have a novel and characteristic property of at least one of the parents in which change has been induced by the method of this invention.

Within the scope of this invention, an enhanced development and growth will be understood as meaning, for example, an increase in the hatching rate and an enhancement of the growth rate.

A further object of the present invention is the provision of a method which modifies the specific stress reactions of fish in desirable and useful manner, especially such that the treated fish are more robust and reach adulthood faster.

Thus, for example, it is possible to reduce very substantially the susceptibility of fish to diseases by the application of the method of this invention, and so to breed the fish under conditions which would normally be critical to their health and which would not permit a normal and controlled development.

Hence the present invention also relates to fish whose specific reactions to specific stress parameters are modified in a desirable and useful manner by the application of the method of this invention, especially those fish which exhibit increased resistance to pathogens.

More particularly, it is an object of the present invention to provide a method of vitalising fish, which comprises a) exposing fertilised fish eggs to an electrostatic field, without flow of current, or fertilising eggs in said field, b) adjusting the field strength to values in the range from 1 V/cm to $10^5$ V/cm, and c) maintaining the electrostatic field until the juvenile fish hatch or mature.

The fertilisation step can, of course, also be carried out in apparatus of this invention (aquarium with electrodes) with the voltage already applied.

In the practice of this invention, the electrostatic field is preferably produced between the electrically insulated plates of a capacitor.

The field strength of the electrostatic field is determined by the following equation:

$$E = U/d$$

where U is the potential difference between the capacitor plates, and d is the distance between the plates.

The potential difference U is produced by a high-tension generator. Any kind of high-tension generator may be used in the method of this invention. Preferred high-tension generators are those based on the transformer principle with rectifier.

The preferred potential difference within the scope of this invention is from 1.0 V (volt) to $10^5$ (V) volt.

For the application of the method of this invention to fish eggs, potential differences of 1 V to 20 000 V, preferably of 100 V to 10 000 V, are used. Most preferred is a potential difference of 500 V to 3 000 V.

The distance between the plates of the capacitor depends on the dimensions of the aquarium, and is, for example, from 0.01 mm to 1 mm, but is preferably from 1 cm to 10 cm.

In practice, the field strength of the electrostatic field at the given distance between the plates of the capacitor is regulated by the strength of the voltage produced by a high-tension generator.

In the practice of this invention, the field strengths are preferably from 1 V/cm to 10 000 V/cm, more preferably from 50 V/cm to 5 000 V/cm but, most preferably, from 500 V/cm to 1 000 V/cm.

For the application of the method of this invention, it is most preferred to use biological material which has a high rate of division and/or still exhibits little differentiation, for example cells capable of division. Specifically, suitable biological material in the context of this invention comprises fertilised of unfertilised eggs as well as early embryonic stages right up to hatchable juvenile fish.

The rate of fertilisation and hatching of fish eggs can be significantly enhanced under the influence of an electrostatic field.

All these foregoing particulars cited by way of exemplification are solely intended to illustrate the invention and in no way restrict the subject matter thereof.

Most particularly, it is an object of the present invention to provide a method wherein the development of the fertilised eggs to juvenile fish takes place in an electrostatic field in which the field strengths may vary preferably from 10 V/cm to 3 000 V/cm. Field strengths of 500 V/cm to 1500 V/cm, more particularly of 500 V/cm to 1 000 V/cm, are especially preferred.

First and foremost, the invention provides a method of enhancing the growth and development efficiency of fish, which method comprises enhancing the fertilisation, hatching and survival rate as well as the growth of fish by a) treating fish eggs with male sperm,
b) placing the treated eggs in incubators in which an electrostatic field is produced,
c) providing field strengths for the electrostatic field of 10 V/cm to 3 000 V/cm,
d) removing the juvenile fish, after hatching, from the sphere of influence of the electrostatic field, and
e) rearing said juvenile fish by methods which are known per se.

The treatment of the fish in the electrostatic field in the practice of this invention is preferably effected in special incubators which, in the bottom and in the cover, contain built-in electrodes which are water-tight and insulated and are connected to a source for producing a high direct-current voltage, and with the aid of which an electrostatic field can be produced inside the incubators. It is, of course, possible to use any other experimental apparatus for treating the fish, provided it meets the basic conditions as set forth above.

After the juvenile fish have hatched, the electric field is removed and the further rearing of the juvenile fish is continued by conventional methods free from the influence of an electric field.

Contrary to all theory, and hence extremely surprisingly, it has been found that, compared with the controls, the juvenile fish which have hatched in the electric field have, in addition to a substantially enhanced fertilisation and hatching rate, further advantageous properties which then also develop after removal of the electric field and influence the further development of the fish.

These further advantageous properties comprise, for example, an enhanced rate of growth compared with the controls. Furthermore, the treated fish, compared with the controls, have a markedly enhanced vitality.

The present invention further relates to the use of the method of this invention for modifying specific stress reactions of fish.

Particularly preferred fields of use relate to the enhancement of resistance to stress, for example to specific environmental factors such as increased salt concentrations in the culture medium, limitation of specific nutrients, limitation of light and/or oxygen, acceptance of pollution and the like.

One of the most frequent stress factors in the living environment is deficiency stress, where one or more factors can simultaneously have a limiting effect.

Deficiency stress occurs as soon as one or more of the factors essential for optimum growth or development, for example light, supply of oxygen/carbon dioxide, supply of nutrients, vitamins and the like, attain suboptimum values. The consequence is that the affected organism is no longer able to maintain to the full its ability to generate the syntheses essential for optimum development and growth, resulting initially in a retardation of growth. If this deficiency stress continues for a prolonged period of time, it results in an impairment of essential functions, leading then as a rule to early onset of senescence and hence ultimately to the death of the affected organism.

Not only a deficiency, but also a superfluity, of specific crucial factors is able to trigger stress reactions. Increased salt concentrations in the nutrient medium leads, for example, to a rise in the osmotic value in the medium and, consequently, to a loss of fluid in the cells present therein, owing to the onset of osmosis and hence to cell shrinkage. The loss of fluid can usually be compensated for to a certain extent by self-regulatory steps taken by the affected organisms. But if a critical threshold is exceeded, then this will result in the death of the cells.

The method of this invention can, in principle, be applied to all species of fish, but preferably to species that are bred on a commercial scale. In this connection, the treatment of edible fish is of particular importance, as it is expected that production costs can be reduced very considerably with the aid of the method of this invention.

To illustrate the somewhat general nature of the foregoing description and to contribute to a better understanding of the invention, reference will now be made to specific working Examples which are non-limitative in character, unless special attention is drawn to them. The same applies to all particulars of an exemplary nature which are contained in the foregoing description.

NON-LIMITATIVE WORKING EXAMPLES

PRODUCING THE ELECTROSTATIC FIELD—EXPERIMENTAL APPARATUS

All experiments hereinafter described are carried out in electrostatic fields which are produced between the plates of a capacitor.

The electric field strength is given by the equation $$E = U/d$$

where
U is the potential difference (voltage) between the capacitor plates, and
d is the distance between the capacitor plates.

The voltage is generated by means of a high-tension generator which operates on the principle of a transformer with rectifier, normally using voltage differences from 500 volt to 12 000 volt.

The distance between the plates will depend on the dimensions of the test tanks used in the individual experiments. Normally the variable parameters U and d will be chosen such that the field strengths of the electrostatic field are from 250 V/cm to 1500 V/cm.

The present invention also relates to an apparatus for the treatment of early development stages of fish with electric fields, said apparatus comprising a) a tank suitable for holding the early development stages of fish in aqueous medium, and b) a source for producing a voltage and, connected therewith, an arrangement of electrodes suitable for producing an electrostatic field in at least a part of the volume surrounded by the tank, which process is characterized in that the arrangement of electrodes is electrically insulated against the medium contained in the tank and is preferably arranged in form of capacitor plates, and that the source of voltage is a source of a direct-current voltage.

Example 1: Effect of an Electrostatic Field on the Development of Fish

It is possible to influence favourably the development of animal organisms with the aid of an electrostatic field, as will be demonstrated in the following experiment carried out with rainbow trout.

1.1 Experimental Apparatus (FIG. 1)

Figure 1:
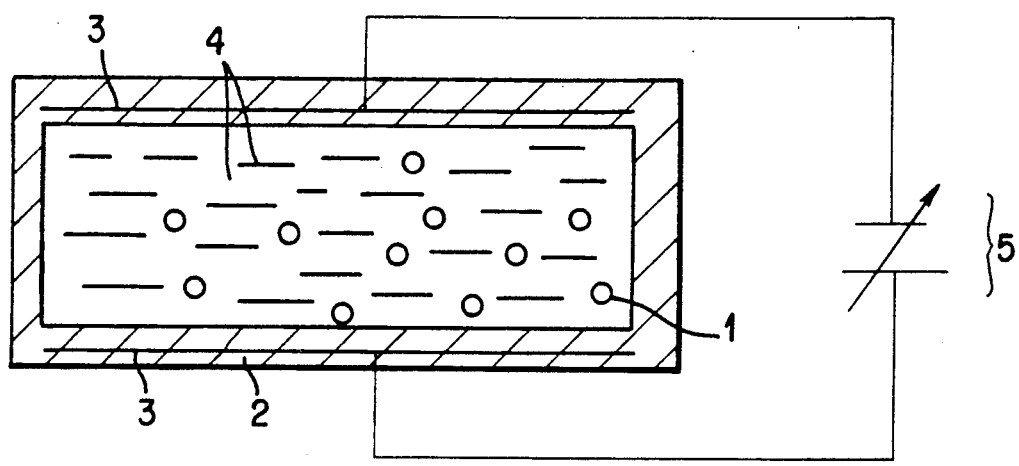
FIG. 1 is a diagram of a preferred form of the invention, being an incubator with a source for an electrostatic field.

Trout eggs (1) in batches of 1000 are treated in tanks with male sperm and immediately placed in incubators. The incubators consist of 1 liter plexiglass tanks (2) measuring $31.5 \times 28.5 \times 4.5$ cm. Aluminium electrodes (3) which are sealed air- and water-tight are built into the cover and bottom of the containers (see FIG. 1).

The incubators are connected to a spring water (4) system of 10°–12° C. and the electrodes are connected to a high-tension generator (5) (FUG HCN 14-12500, available from Weter, Schaffhausen, Switzerland). The voltage applied is 215 volt and the space between the plates is 3 cm, so as to provide a field strength of 716 V/cm between the electrodes. The fertilisation and ripening of the eggs takes place in this apparatus. The eye stage is reached after ca. 4 weeks, and the brood hatches after ca. 8 weeks.

After hatching, the brood is transferred to tanks measuring $50 \times 50 \times 15$ cm with laminar flow and the electric field is removed, so that the further development of the juvenile fish may take place free from the influence of the field.

1.2 Results

Table 4 shows that the number of juvenile fish which have hatched under the influence of the electrostatic field is markedly greater than that of the controls.

Compared with the controls, the number of fish which perished after hatching and after 5 weeks was reduced by about half with aid of the field.

In addition, a growth increase effect of the field can also be detected. The size of the juvenile fish hatched under the influence of the electrostatic field, 10 weeks after hatching, is from 30 to 40% higher than that of the control fish (q.v. Table 1).

|  | free from field | with field | |
|---|---|---|---|
|  |  | tank 1 | tank 2 |
| hatched juvenile fish | 140 | 244 | 469 |
| perished after hatching | 37 | 14 | 19 |
| perished after 5 weeks | 10 | 5 | 6 |
| size after 10 weeks | 2.6 cm | 3.4 cm | 3.6 cm |

The fish incubated in the field exhibit a markedly greater vitality.

What is claimed is:

1. A method of enhancing the growth and development efficiency of fish, which method comprises enhancing the fertilisation, hatching and survival rate as well as the growth of fish, which method comprises
   a) treating fish eggs with male sperm,
   b) placing the treated eggs in incubators in which an electrostatic field is produced,
   c) providing field strengths for the electrostatic field of 10 V/cm to 10 000 V/cm,
   d) removing juvenile fish, after hatching, from the sphere of influence of the electrostatic field, and
   e) rearing said juvenile fish by methods which are known per se.

2. A method according to claim 1, wherein the field strengths are from 500 V/cm to 1 000 V/cm.

3. A method according to claim 1, wherein the fish is a trout.

4. A method according to claim 1, wherein the electrostatic field is in the range from 10 V/cm to 3000 V/cm.

5. A method of enhancing the growth and development efficiency of fish, which method comprises enhancing the fertilisation, hatching and survival rate as well as the growth of fish, which method comprises
   a) treating fish eggs with male sperm,
   b) placing the treated eggs in incubators in which an electrostatic field is produced,
   c) providing field strengths for the electrostatic field of 10 V/cm to 3000 V/cm,
   d) removing juvenile fish, after hatching, from the sphere of influence of the electrostatic field, and
   e) rearing said juvenile fish by methods which are known per se.

6. A method of inducing desirable and useful properties in fish, which comprises:
   a) producing an electrostatic field by means of capacitor plates which are insulated against water acting as dielectric medium and whereby the flow of current is prevented;
   b) exposing early development stages of the fish to said electrostatic field under controlled conditions such as to induce lasting useful and desirable properties in the fish; and
   c) keeping said early development stages of the fish in said electrostatic field for a period of time suitable for inducing the desirable and useful properties in the fish.

7. A method according to claim 6, which comprises exposing fertilised fish eggs to the electrostatic field.

8. A method according to claim 7, which comprises leaving the fertilised eggs to ripen in the electrostatic field.

9. A method according to claim 8, wherein the electrostatic field is in the range from 1 V/cm to $10^5$ V/cm.

10. A method according to claim 9 for inducing enhanced vitality in fish.

11. A method according to claim 6, which comprises fertilising fish eggs in the electrostatic field.

12. A method according to claim 11, which comprises leaving the fertilised eggs in the electrostatic field until the juvenile fish hatch.

13. A method according to claim 12, wherein the electrostatic field is in the range from 1 V/cm to $10^5$ V/cm.

14. A method according to claim 13 for inducing enhanced vitality in fish.

15. A method according to claim 6 for enhancing the efficiency of the development and growth of freshwater and saltwater fish. rate.

16. A method according to claim 15 for enhancing the hatching rate.

17. A method according to claim 6 for inducing enhanced vitality in fish.

* * * * *